United States Patent [19]

Bumb, Jr.

[11] 3,777,070

[45] Dec. 4, 1973

[54] TAPE GUIDE AND MAGNETIC HEAD-PRESSURE PAD SPACER

[75] Inventor: Frank C. Bumb, Jr., San Gabriel, Calif.

[73] Assignee: California Data Machines, Los Angeles, Calif.

[22] Filed: Sept. 23, 1971

[21] Appl. No.: 183,205

[52] U.S. Cl. .................................... 179/100.2 Z, 179/100.2 CA, 242/55.19 A, 274/4 E

[51] Int. Cl. .... G11b 23/04, G11b 15/62, G11b 5/58

[58] Field of Search ............ 179/100.2 Z, 100.2 CA, 179/100.2 D; 274/4 A, 4 C, 4 E, 11 F; 242/55.19 A, 199, 200

[56] References Cited

UNITED STATES PATENTS

| | | | |
|---|---|---|---|
| 3,322,360 | 5/1967 | Roys | 242/55.19 A |
| 3,417,938 | 12/1968 | Markakis et al. | 179/100.2 Z |
| 3,378,266 | 4/1968 | Karecki | 179/100.2 CA |
| 3,445,116 | 5/1969 | Knox | 179/100.2 CA |
| 2,617,890 | 11/1952 | Barany et al. | 179/100.2 D |
| 2,612,565 | 9/1952 | Heller | 179/100.2 D |

*Primary Examiner*—Vincent P. Canney
*Assistant Examiner*—Alfred H. Eddleman
*Attorney*—H. Calvin White et al.

[57] ABSTRACT

For use in a magnetic tape transport assembly wherein a pressure pad carried by a tape cartridge is adapted to urge the tape toward a read or write head, and in combination with said head, the improvement comprising spacer means projecting at the tape side of the head for seating the pad at a predetermined space from the head characterized in that the tape remains free for travel lengthwise in said space adjacent the head and out of contact with the pad.

1 Claim, 7 Drawing Figures

TAPE GUIDE AND MAGNETIC HEAD-PRESSURE PAD SPACER

BACKGROUND OF THE INVENTION

This invention relates generally to biasing the movement of magnetic tape in transport assemblies. More specifically, it concerns elimination of tape cartridge pressure pad biasing of the tape in systems not requiring such biasing.

A specialized class of digital tape recorders has evolved that utilize the Philip's-type cassette as a storage medium. The cassettes were originally developed by Phillips for audio usage; however, for use with digital transports, the cassettes have required some modifications to make he combined transport-cassette system more reliable. For example, cassettes must be manufactured and inspected to closer tolerances to control friction between reel hubs and cassette. For computer quality, error free has been utilized, and rollers are machined to closer tolerances and inspected for frictional drag.

Standards for the usage of cassettes are being established so as to control the physical parameters of the tape, cassette, and the cassette transport. These standards will allow interchangeability of cassettes between transports and uniformity of performance in field usage.

The original cassette for audio use incorporated a pressure pad within the cassette. This pad, usually consisting of felt, presses the tape against the head when the head is inserted into the cassette. The pressure of the tape against the head generates a frictional force that establishes tension in the tape. This is a desirable technique to insure adequate head-to-tape contact and establish proper tape tension with the tape moving in the forward direction. Use of a pressure pad also means that audio transports do not require any holdback torque or drag on the supply reel of the transports to generate tape tension.

The present, tentative industry standards for tape cassettes retain the pressure pad feature. For some digital transport design, however, the pressure pad can actually create problems. The pressure pad creates a tape tension that varies with temperature and humidity; additionally, it is a possible source of contaminants. Manufacturing tolerances of the pressure pad and the spring means must be closely controlled to yield uniform pressures. In digital transports that have one capstan and operate in a forward direction only, potential problems caused by the pressure pad are minimized. In order to design bi-directional digital machines, some manufactures utilize two capstans and alternately engage a pressure roller on one or the other capstan for forward or reverse tape motion. In digital transports that utilize only one capstan operating bi-directionally, the frictional drag of the pressure pad in the reverse direction causes the take-up tension to be excessively high.

While one might remove pressure pads from cassettes, this is not practical, since special cassettes are then required, and digital transports accommodating such special cassettes will not then accomodate cassettes having pressure pads.

SUMMARY OF THE INVENTION

The present invention has as its general object the elimination or substantial reduction of problems discussed above, the undesirable effects of the pressure pad being removed while the pad itself is retained so as not to require changing the basic cassette configuration. Basically, and in accordance with the invention, spacer means is provided to project at the tape side of the head for seating the pad at a predetermined spacing from the head characterized in that the tape may then travel lengthwise in that space adjacent the head and out of contact with the pad. Such travel may be bi-directional if desired, and with approximately the same tape tension in both directions. As will be seen, the spacer means may advantageously be carried by the read/write head and project toward the pad, there being shoulders on the spacer means spaced widthwise of the tape to be engagable by the tape edges for guiding the tape traveling endwise in the provided space. Accordingly, the pad spacer means also acts to guide the tape over a typically convexly curved portion of the tape travel path, the tape at that point having significant lateral stiffness, and the guiding action has maximum effect at the critical tape position where the head functions to read to write.

These and other objects and advantages of the invention, as well as the details of an illustrative embodiment, will be more fully understood from the following description and drawings, in which:

DRAWING DESCRIPTION

DETAILED DESCRIPTION

Figures 1, 2:
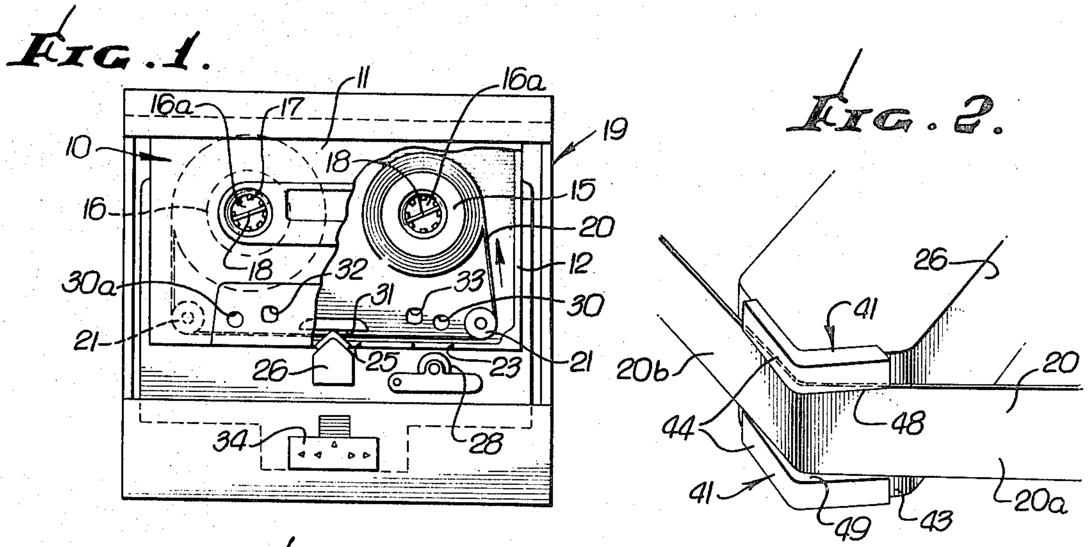
FIG. 1 is a plan view showing of a cassette in tape read or write apparatus.
FIG. 2 is a perspective showing of a pressure pad spacer and tape guide associated with a read/write head.

Referring first to FIGS. 1 and 2, the Philips type tape cassette is shown to include a hollow case 10 having upper and lower case sections 11 and 12 which are suitably attached together. Mounted in the case are a pair of winding reels 15 and 16, suitable annular flanges in the case sections supporting the reels for rotation. The reels are themselves annular to form central openings 16*a* into which the lugs 17 on the reels project inwardly toward the axes of rotation, as shown. These lugs interfit a driving element shown at 18 in FIG. 1, and which is a part of the playback unit 19. Accordingly, during playback the tape 20 is wound on the reel 15, as shown, in response to rotation of the driving element 18.

Also contained within the case are two idler rolls 21 about which the tape travels during advancement thereof. In this regard, the case has an elongated opening along one edge thereof to expose tape traveling lengthwise along said edge. In this regard, when the cassette is mounted on the playback equipment 19, the tape is exposed to a magnetic read/write head 26 opposite opening 25, and an idler roller 28 opposite the other opening 23. In this regard, the head 26 and the roller 28 are relatively movable into engagement with the tape in order to enable operation of the equipment. Similarly, these elements are movable relatively away from the tape to facilitate mounting and demounting of the cassette in the playback equipment. Aligned openings 30 in the case are adapted equipment. Aligned openings 30 in the case are adapted to receive a rotary capstan immediately behind the tape for driving the latter when the idler roller 28 urges the tape into contact with the capstan. A similar pair of aligned openings appear at 30*a* for the same use when the cassette is turned over for driving the tape in the opposite direction.

A spring urged support or pressure pad 31 is located inwardly of the tape and opposite the magnetic head 26, the pad being carried by the cassette and typically consisting of a piece of soft felt. The pad normally serves as a back-up for the tape when the magnetic head is brought into contact with the opposite side of the tape. Finally, two pairs of aligned openings 32 and 33 are formed in the case to receive posts for locating and locking the cassette in place upon the playback equipment 19. A manual control is shown at 34 and is operable to effect displacement of the head 26 and roller 28 relatively into engagement with the tape (although this is done by a servo in digital machines). Such a cassette is illustrative only, others being usable.

Figure 3:
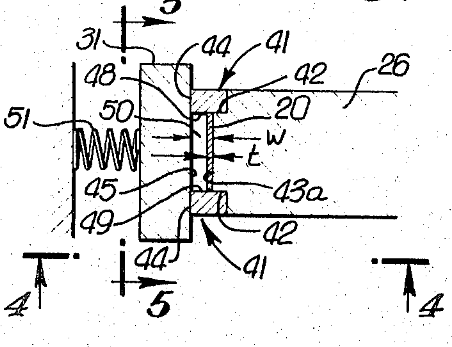
FIG. 3 is a side elevation, taken in section, showing tape head, spacer means and pressure pad.
Figure 4:
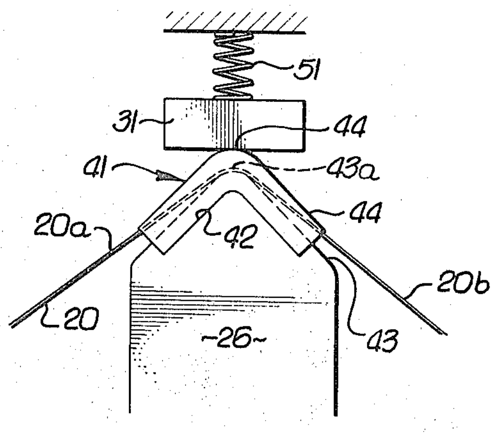
FIG. 4 is a top plan view taken on lines 4—4 of FIG. 3.
Figure 5:
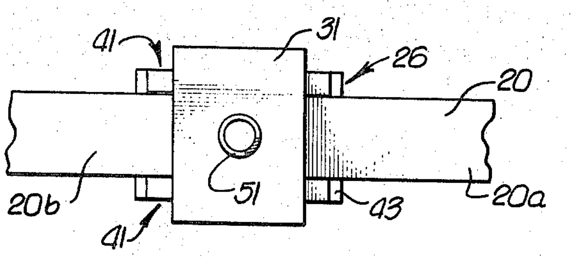
FIG. 5 is a front elevation taken on lines 5—5 of FIG. 3.

In accordance with the invention, spacer means is provided to project at the tape side of the head for seating the pressure pad at a predetermined spacing from the head, and characterized in that the tape remains free for travel lengthwise in that space adjacent the head and out of contact with the pad. In the FIG. 2–4 embodiment, the spacer means includes like upper and lower sections 41 carried by the head 26, as in notches 42 defined by the latter. The spacer sections project outwardly beyond the tape engaging face 43 of the head 26 to define pressure pad seating shoulders 44, whereby the spacing *w* between the pad face 45 and head face 43 is greater than the thickness *t* of tape 20. This blocks or prevents creation of drag that would otherwise be caused by pressure of the pad against the tape for holding the latter against the head.

The tape may be held against the head by directing it to travel along paths 20*a* and 20*b* tapering toward the projected extremity of the head, which appears at 43*a*.

Note that paths 20*a* and 20*b* taper in the same directions as the head face.

The spacer sections also present shoulders 48 and 49 spaced widthwise of the tape to be engageable by the tape edges, for accurately guiding the tape as it travels endwise in space 50 at the precise point of magnetic interaction between tape and head, as during read or write modes. Accordingly, the spacer sections have both tape guiding and pressure pad blocking functions, with advantages as referred to. Sections 41 may have V- or U-shape, as best seen in FIG. 2, the apices of the sections being engageable by the pressure pad. The spring urging the pad is indicated at 51.

Figure 6:
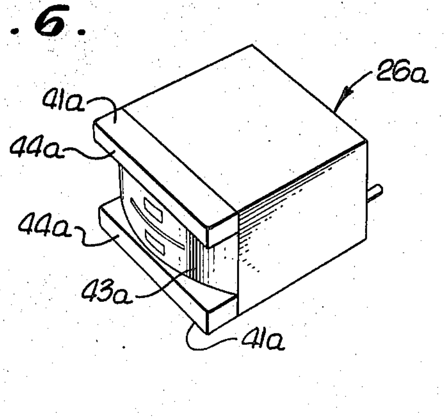
FIGS. 6 and 7 are perspective views showing modifications of the head and spacer combination.
Figure 7:
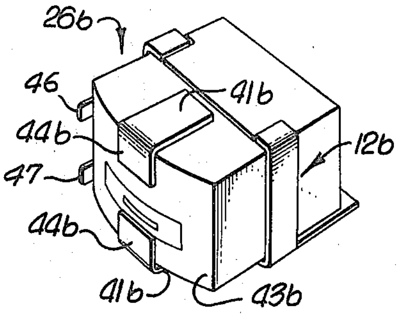

In the FIG. 6 modified form, the spacer upper and lower sections 41*a* carried by the head 26*a* have flat outer surfaces 44*a* rather than conforming to the curvature of the head face 43*a*. The same is true of the FIG. 7 spacer upper and lower sections 41*b* carried by head 26*b*, the latter having a curved tape engaging face 43*b* and the spacer sections having flat outer surfaces 44*b*.

I claim:

1. In a magnetic tape transport assembly wherein a pressure pad carried by a Philips design tape cassette is adapted to urge the tape toward a read or write head, and in combination with said head, the improvement comprising spacer means including upper and lower sections projecting at the tape side of the head and intercepting and seating upper and lower portions of the pad resiliently urged against spacer section terminals at a predetermined spacing from the head characterized in that the tape remains free for travel lengthwise in said space adjacent the head and out of contact with the pad, said spacing substantially exceeding the tape thickness, the pad being pushed away from the head by spacer means, sais spacer means upper and lower sections spaced apart vertically by an amount less than the width of said Philips design cassette pad but greater than the tape width, said assembly being free of structure proximate the head for urging the tape against the head, and there also being tape edge guide shoulders spaced from said spacer means.

* * * * *

UNITED STATES PATENT OFFICE
CERTIFICATE OF CORRECTION

Patent No. 3,777,070 Dated December 4, 1973

Inventor(s) Frank C. Bumb, Jr.

It is certified that error appears in the above-identified patent and that said Letters Patent are hereby corrected as shown below:

Column 1, line 19; "quality, error free has been utilized, and rollers are ma- " should read -- quality, error free tape has been utilized, and rollers are ma- --

Column 3, lines 2, 3 and 4; "the cassette in the playback equipment. Aligned openings 30 in the case are adapted equipment. Aligned openings 30 in the case are adapted to receive a rotary" should read -- the cassette in the playback equipment. Aligned openings 30 in the case are adapted to receive a rotary --

Column 4, line 20; "and the spacer sections having flat outer surfaces 44b." should read -- and the spacer sections having flat outer surfaces 44b. Tape edge guides appear at 46 and 47.--

Column 4, line 35; "spacer means, sais spacer means upper and lower sec- " should read -- spacer means, said spacer means upper and lower sec- --

Column 4, lines 37 and 38; "width of said Philips design cassette pad but greater than the tape width, said assembly being free of struc- " should read -- width of said Philips design cassette pad but at least as great as the tape width, said assembly being free of struc- --

Column 4, line 41; "spaced from said spacer means." should read -- spaced lengthwise of the tape from that portion of the head closest to the pad. --

Signed and sealed this 2nd day of April 1974.

(SEAL)
Attest:

EDWARD M. FLETCHER, JR.
Attesting Officer

C. MARSHALL DANN
Commissioner of Patents